US010465125B2

(12) United States Patent
Shi

(10) Patent No.: US 10,465,125 B2
(45) Date of Patent: Nov. 5, 2019

(54) REGENERATION METHOD FOR CATALYTIC CRACKING REACTION

(71) Applicant: Baozhen Shi, Shandong (CN)

(72) Inventor: Baozhen Shi, Shandong (CN)

(*) Notice: Subject to any disclaimer, the term of this patent is extended or adjusted under 35 U.S.C. 154(b) by 315 days.

(21) Appl. No.: 15/507,899

(22) PCT Filed: Jan. 21, 2015

(86) PCT No.: PCT/CN2015/071194
§ 371 (c)(1),
(2) Date: Mar. 1, 2017

(87) PCT Pub. No.: WO2016/054879
PCT Pub. Date: Apr. 14, 2016

(65) Prior Publication Data
US 2017/0267933 A1 Sep. 21, 2017

(30) Foreign Application Priority Data
Oct. 9, 2014 (CN) .......................... 2014 1 0525173

(51) Int. Cl.
C10G 11/00 (2006.01)
B01J 38/34 (2006.01)
(Continued)

(52) U.S. Cl.
CPC ............... C10G 11/00 (2013.01); B01J 8/001 (2013.01); B01J 8/003 (2013.01); B01J 8/0035 (2013.01);
(Continued)

(58) Field of Classification Search
CPC ............... C10G 11/00; C10G 2300/70; C10G 2300/708; B01J 8/1836; B01J 8/1809;
(Continued)

(56) References Cited

U.S. PATENT DOCUMENTS 4,299,687 A 11/1981 Myers
4,965,232 A * 10/1990 Mauleon ............... B01J 38/34
208/113
(Continued)

FOREIGN PATENT DOCUMENTS

CN 1221022 A 6/1999
CN 1393512 A 1/2003
(Continued)

Primary Examiner — Randy Boyer
Assistant Examiner — Juan C Valencia
(74) Attorney, Agent, or Firm — Coats & Bennett PLLC

(57) ABSTRACT

A regeneration method for catalytic cracking reaction, the method is applied in a catalytic reaction process of petroleum hydrocarbon materials, and the method comprises: feeding the regenerated and semi-regenerated catalyst from a regenerator separately into different positions of a reactor for reaction. A part of the semi-regenerated catalyst is firstly processed in a purification cooler for removing carried nitrogen, oxygen, carbon dioxide and impurity gases before being fed into the reactor. Spent catalyst or the purified and cooled semi-regenerated catalyst is fed into a catalyst mixing section of the reactor for controlling the temperature of the catalyst being contact with the oil material to be gasified, thereby achieving a three stage cycle of the catalyst in the reactor and a three stage control for the reaction outlets of the oil material gasification zone and the cracking reaction zone and the catalyst taking part in the reaction.

20 Claims, 4 Drawing Sheets

(51) Int. Cl.
  *B01J 8/18* (2006.01)
  *B01J 8/24* (2006.01)
  *B01J 8/00* (2006.01)
  *B01J 38/12* (2006.01)
  *B01J 8/26* (2006.01)

(52) U.S. Cl.
  CPC .......... *B01J 8/0055* (2013.01); *B01J 8/1809* (2013.01); *B01J 8/1836* (2013.01); *B01J 8/24* (2013.01); *B01J 8/26* (2013.01); *B01J 38/12* (2013.01); *B01J 38/34* (2013.01); *B01J 8/1863* (2013.01); *B01J 2208/0038* (2013.01); *C10G 2300/70* (2013.01); *C10G 2300/708* (2013.01)

(58) Field of Classification Search
  CPC ........ B01J 8/0055; B01J 8/003; B01J 8/0035; B01J 8/001; B01J 8/24; B01J 8/26; B01J 38/34; B01J 38/12; B01J 8/1863; B01J 2208/0038
  See application file for complete search history.

(56) References Cited

U.S. PATENT DOCUMENTS

| | | |
|---|---|---|
| 5,800,697 A | 9/1998 | Lengemann |
| 5,944,982 A | 8/1999 | Lomas |
| 6,059,958 A | 5/2000 | Ramos et al. |
| 6,558,530 B2 | 5/2003 | Schlosser et al. |

FOREIGN PATENT DOCUMENTS

| | | |
|---|---|---|
| CN | 1664074 A | 9/2005 |
| CN | 101144028 A | 3/2008 |
| CN | 101161786 A | 4/2008 |
| CN | 101191067 A | 6/2008 |
| CN | 101191068 A | 6/2008 |
| CN | 101191071 A | 6/2008 |
| CN | 101191072 A | 6/2008 |
| CN | 101210197 A | 7/2008 |
| CN | 101665710 A | 3/2010 |
| CN | 103045300 A | 4/2013 |

* cited by examiner

REGENERATION METHOD FOR CATALYTIC CRACKING REACTION

This application is a continuation of International Application No. PCT/CN2015/071194, filed on Jan. 21, 2015, which claims priority to Chinese Patent Application No. 201410525173.5, filed on Oct. 9, 2014, both of which are hereby incorporated by reference in their entireties.

TECHNICAL FIELD

The present invention relates to a gaseous- and solid-phase catalytic reaction technique in the field of petroleum and chemical industry, and in particular to a catalytic reaction-regeneration method for petroleum hydrocarbons.

BACKGROUND ART

The catalytic cracking reaction of petroleum hydrocarbons is a secondary processing of crude oil, and mainly consists of gaseous- and solid-phase cracking, wherein its feedstock generally has a specific gravity greater than 0.9. The reaction process generally produces coke in an amount of 5.5% to 10.0% of the feedstock, and the coke adheres onto the surface of the catalyst and blocks the micro-pores in the catalyst, which necessitates recycle and regeneration of the catalyst.

The catalyst regeneration process plays an important role in the catalytic cracking reaction, with respect to equipment investment, operational energy consumption, and maintenance cost. Reducing the excessive oxygen in flue gas, reducing the gas pressure drop in the regeneration system, reducing the catalyst inventory, and reducing hydrothermal deactivation of catalyst caused by hydrogen reaction, all have great significance for improvement in the regeneration effect and the catalytic cracking process.

Typical catalyst regeneration techniques currently available include two-stage regeneration, the countercurrent two-stage regeneration techniques. In particular, the countercurrent two-stage regeneration technique developed by UOP and the Beijing Design Institute of Sinopec exhibits high efficiency. U.S. Pat. No. 4,299,687 discloses a reaction-regeneration technique based on two-stage countercurrent regeneration, co-developed by UOP and Ashland. CN 97121795.5 discloses a stacked two-stage regeneration technique for fluid catalytic conversion of heavy oil.

The catalyst is a key element to the catalytic cracking reaction of petroleum hydrocarbons, but its performance during the reaction is different from that before the reaction. For example in the case of catalytic cracking reaction of hydrocarbons, the catalyst performance during the reaction may gradually goes down because of coke formation, contamination by alkaline components and metals, and passivation during the reaction. In addition, reaction conditions such as the catalyst activity, the catalyst-to-oil ratio or the space velocity, and the temperature and temperature difference of feedstock and catalyst in the reaction are all important factors influencing the reaction results, and changes and control of these conditions would change the reaction results.

The target product of catalytic cracking reaction of petroleum is the component having a carbon number higher than $C_3$, while the small-molecule products of $C_2$ or lower are mainly produced by thermal cracking. Enhancing the catalytic cracking reaction while reducing the thermal cracking has always been a pursued objective for the catalytic cracking process. During catalytic cracking reaction, the selection and control of reaction conditions are directly related to the conversion rate and product selectivity of the reaction. There are many techniques for optimizing the operation of the reaction system. For instance, in the catalytic conversion of petroleum hydrocarbon feedstock, the dry gas pre-lift technique, the mixed temperature controlling technique by changing the feedstock injection point and injection media, the fast separation technique at reactor outlet zone, and the rapid-cooling termination technique all exert remarkable impacts on the reaction outcome and have been well practiced in the industry. Improvements in and controlling of catalyst performances during the reaction are also critically important.

Since 1970s, fluidized-bed reactors have been replaced with riser reactors for catalytic cracking reaction of petroleum hydrocarbons. Catalytic cracking reaction of petroleum hydrocarbon feedstock is a gas- and solid-phase reaction, the feedstock for the reaction is generally liquid feed which needs to absorb heat to be vaporized first, and then the gaseous reactants enter the micro-pores and channels in the catalysts to undergo catalytic reaction. The heat of vaporization for the gaseous reactants is provided by regenerated catalyst. Catalytic reactions of liquid feedstock in tubular reactors all have two stages, i.e. vaporization of liquid and gas-phase reaction. The vaporization is achieved by the heat provided by contact with the catalyst, and there is more or less reaction occurring during the vaporization. The intrinsic advantage of tubular reactors lies in the presence of a "gradient", by which the purpose of increasing the "driving force" of the reaction can be achieved and the efficiency and selectivity of the reaction can be improved. And this is the major reason why fluidized-bed reactors are replaced with riser reactors. Petroleum hydrocarbon feedstock has complex compositions, and the feedstock entering the inlet of the reactor has a molecular weight of about 300, while the product exiting the outlet of the reactor has a molecular weight of about 100 or less. The riser reactor exhibits various reactant properties and reaction processes at different positions inside the reactor. For example, at the initial stage in the gas-phase reaction zone above the atomizing nozzle, vaporized feedstock oil mainly undergoes cracking reaction of large molecules in the feedstock oil which generally lasts for around 1.5 seconds, while in the gas-phase reaction zone at the next half of the riser, further reaction as well as isomerization and hydrogen transfer among small molecule components such as diesel, gasoline and liquefied gas, is dominant. Thus, the entire gas-phase reaction zone is often divided into "cracking reaction zone", "reformation reaction zone", etc. For the liquid vaporization reaction, both the temperature difference between the catalyst and the feedstock and the high temperature of the catalyst can enhance thermal cracking reaction, increase the fraction of byproducts of $C_2$ or lower C number fractions, and affect the economic benefit. The temperatures of the gas-phase cracking reaction zone and the reformation reaction zone, the catalyst-to-oil ratio, and the catalyst activity all have significant influence on the reaction results of the entire reaction zone.

For example, with regard to the catalytic conversion of petroleum hydrocarbon-based feedstock, it has been confirmed by worldwide studies that a high temperature of the regenerated catalyst results in a low catalyst-to-oil ratio in the reaction, and a large temperature difference between the catalyst and the feedstock upon contact with the catalyst leads to a high production of dry gas and severely affects the yield; in the riser, with the proceeding of reaction, the catalyst activity rapidly decreases, and the efficiency in the reaction zone downstream of the riser is lowered, therefore affecting the outcome of the reaction. Lowering the temperature of the regenerated catalyst, increasing the catalyst-to-oil ratio, and increasing the catalyst activity in the riser have been the objectives pursued for many years for catalytic cracking units.

There are many technical means to reduce the temperature difference between the regenerated catalyst and the feedstock oil in the contact zone where the reaction feedstock liquid phase is vaporized. In order to lower the temperature upon initial contact with feedstock oil, the most straightforward way is to "transfer the low-temperature catalyst from the external catalyst cooler to the pre-lift section of the riser". In 1990s, UOP proposed a method of transferring the low-temperature catalyst from the external catalyst cooler to the pre-lift section of the riser, in the U.S. Pat. No. 5,800,697. There are a number of related patent documents, such as U.S. Pat. No. 6,059,958, 6,558,530B1, CN01119805.1, CN1664074A, CN101191067A, and CN101191072A, etc.

U.S. Pat. No. 5,800,697 discloses a method for catalytic conversion reaction and regeneration, wherein a catalyst cooling zone is arranged beside a regenerator, the hot regenerated catalyst from a dense bed enters the cooling zone through an outlet and is cooled to an appropriate temperature by heat exchange, and then enters the bottom part of the riser reactor via a regenerated-catalyst standpipe and a slide valve to participate in the reaction, so that the catalyst-to-oil ratio of the reaction becomes an independent variable. CN101161786A discloses a conversion method of petroleum hydrocarbons, wherein the hot regenerated catalyst is cooled by a cooler and returns to the bottom part of the reactor where it goes into contact with the feedstock oil to undergo the cracking reaction; the spent catalyst is transferred to a regenerator after steam stripping to undergo coke-burning regeneration, and then is recycled or partially directed to a mixer at the bottom of the reactor. CN101191067A discloses a temperature regulating device for regenerated catalyst in a catalytic cracking apparatus, wherein a catalyst cooler is installed beside the dense bed of the regenerator, the heat exchange tubes are provided inside the catalyst cooler, a flue gas returning pipe is provided above the cooler, fluidizing rings are provided in the sections along the vertical direction of the catalyst cooler, and the cooled regenerated catalyst enters the pre-lift section of the riser reactor to participate in the reaction. CN101191071A also discloses a temperature regulating device for regenerated catalyst in a catalytic cracking apparatus, wherein a partition is provided in the dense bed of the regenerator to divide the dense bed of the regenerator into two zones, one for coke-burning regeneration and the other for catalyst cooling, a catalyst inlet of the cooler is provided at the lower part of the partition, a heat exchange tube is provided in the catalyst cooling zone, and the cooled regenerated catalyst enters the pre-lift section of the riser reactor to participate in the reaction.

Another way to reduce the temperature difference between the feedstock oil and the regenerated catalyst upon their initial contact is to elevate the temperature of the feedstock oil. CN101144028A discloses a method for cracking of hydrocarbon oil, wherein hydrocarbon oil and regenerated catalyst are heated in a heat exchanger, and then the heat-exchanged hydrocarbon oil and the heat-exchanged regenerated catalyst react upon contact with each other in the reactor.

Catalytic cracking reaction of petroleum hydrocarbons generally employs tubular reactors. However, different reaction processes take place at different positions of a riser reactor, among which vaporization of feedstock oil is carried out first, followed by catalytic cracking reaction which converts large molecule feedstock into products mainly consisting of gasoline and diesel, accompanied subsequently by further reaction of components of gasoline and diesel. Reactions at different positions require different reaction conditions. The condition to be controlled in current catalytic cracking reaction of petroleum hydrocarbon feedstock is the temperature at the outlet, which is however very different from the conditions at various portions of the riser. The condition at the outlet cannot reflect the reaction processes and results at the various portions. Controlling techniques for optimizing reaction conditions have been developed, mainly focusing on optimization of the reaction feedstock and flow scheme and optimization of reaction temperature and time duration, but little on the effect of catalyst during the reaction. The above patent documents only involve lowering the temperature of the regenerated catalyst in the pre-lift section.

In the prior art described above that lowers the temperature of the regenerated catalyst, the catalyst from the external catalyst cooler carries some oxygen and regeneration flue gas, wherein the oxygen enters the reactor and reacts with the reaction media, and poses the problem of affecting the products, and whereas the flue gas carry-over from the regenerated catalyst would increase the load of the rich gas compressor and energy consumption.

In addition, catalyst influences the reaction process not only by the catalyst temperature in the pre-life section, the temperature difference upon contact in the liquid phase (feedstock oil) vaporization zone and the catalyst-to-oil ratio before the reaction, but also considerably by the catalyst activity and the catalyst-to-oil ratio in the gas-phase cracking reaction zone after vaporization of the feedstock oil.

In addition to improvements on the catalyst in the liquid-phase vaporization zone, improvements in the catalyst effect during the reaction should also include improvements on the catalyst in the gas-phase reaction zone after vaporization of the feedstock oil, controlling of the status of the catalyst provided, and controlling of the gas carried by the catalyst.

In summary, the way the catalyst enters a reactor greatly influences the improvement in the reaction results, and it is more significant to optimize regeneration and reaction and to build a synergistic, integrated reaction-regeneration system.

SUMMARY OF INVENTION

The present invention mainly aims to provide a reaction-regeneration method for catalytic cracking reaction, wherein a double circulation of regenerated catalyst and semi-regenerated catalyst is formed between reactor and regenerator. According to the requirements of reaction, the regenerator simultaneously provides differently regenerated catalysts for the reactor, so that the thermal cracking reaction, especially the thermal cracking reaction in the vaporization and cracking reaction zones, can be reduced, the thermal equilibrium between vaporization and the reaction can be regulated, multi-site control of the catalyst in each reaction zone can be conveniently and flexibly achieved, and the energy consumption can be reduced.

In order to achieve the above objective, the present invention provides a reaction-regeneration method for catalytic cracking reaction, for use in the process of catalytic reaction of petroleum hydrocarbon-based feedstock, comprising:

arranging regenerator, reactor, and catalyst purifying or striping and cooling device in parallel, wherein:

the regenerator is used for coke-burning regeneration of the spent catalyst fed from the reactor, and according to the flow direction of the fed spent catalyst and the coke-burning degree, the coke-burning zone of the regenerator is divided into a semi-regenerated catalyst section for semi-regenerated catalyst and a regenerated catalyst section for regenerated catalyst, wherein the regenerated catalyst section is located below the semi-regenerated catalyst section, and wherein the regenerator is provided with a returning pipe which introduces the semi-regenerated catalyst from the semi-regenerated catalyst section of the coke-burning zone into the regenerated catalyst section;

the reactor has a riser reaction section as the main part, a catalyst mixing section with a enlarged diameter provided at the bottom, and feedstock oil inlets of the reactor located between the catalyst mixing section and the riser reaction section, wherein above the feedstock oil inlets are a feedstock oil vaporization zone and a catalytic cracking reaction zone in this order, and a settler is provided downstream of the catalytic cracking reaction zone;

the spent catalyst from the reactor enters the semi-regenerated catalyst section of the coke-burning zone of the regenerator, and goes into contact and reacts with the oxygen-containing gas from below, to form semi-regenerated catalyst which then enters the regenerated catalyst section of the coke-burning zone via the returning pipe and goes into contact and reacts with the oxygen-containing gas from the bottom of the coke-burning zone to accomplish the regeneration and form regenerated catalyst;

the regenerated catalyst is introduced into the catalyst mixing section of the reactor; a part of the semi-regenerated catalyst is drawn out of the regenerator; this part of the semi-regenerated catalyst first enters the catalyst purifying or stripping and cooling device wherein it is cooled to a required temperature and the gaseous medium carried by the catalyst is released or stripped by displacement, and then:

enters the reactor from location above the feedstock oil inlets (the entry point) to participate in the catalytic cracking reaction, or enters the catalyst mixing section at the bottom of the reactor to be mixed with the regenerated catalyst, and participates in the vaporization and catalytic cracking reaction of the feedstock oil, or is split into two streams, one of which enters the reactor from location above the feedstock oil inlets of the reactor, the other one of which enters the catalyst mixing section at the bottom of the reactor;

the feedstock oil enters the reactor to contact with the catalyst so as to complete vaporization and catalytic cracking reaction; and after the reaction, the spent catalyst is subjected to gas-solid separation in the settler, then enters the steam stripping section for steam stripping, and then enters the regenerator for regeneration.

According to the specific embodiment of the invention, in this method of the invention, a dilute phase section is provided above the coke-burning zone of the regenerator, the coke-burning zone and the dilute phase section are vertically coaxially arranged, the flue gas in the coke-burning zone after the reaction moves upwards and enters the dilute phase section, the semi-regenerated catalyst carried by the flue gas is separated from the flue gas carrying the catalyst in the gas-solid separator, and the flue gas is discharged through a flue gas pipe.

According to an embodiment of the invention, in the method of the invention, a first distribution plate is provided in the coke-burning zone of the regenerator and below the inlet of the spent catalyst, and divides the coke-burning zone into a semi-regenerated catalyst section above the first distribution plate and a regenerated catalyst section below the first distribution plate. The first distribution plate may be a perforated partitioning plate or take other forms, and one of its functions is to allow the gas (which may carry some catalysts) from the coke-burning zone underneath the distribution plate to uniformly enter the coke-burning zone above the distribution plate through the first distribution plate. In the method of the invention, a part of the oxygen-containing gas to be used for regeneration directly enters the regenerated catalyst section from the bottom of the coke-burning zone of the regenerator, to participate in the coke-burning regeneration, and then the gas enters the coke-burning zone above the first distribution plate through the distribution plate. In addition, a part of the oxygen-containing gas may be introduced by a first gas distributor to directly enter the semi-regenerated catalyst section. Preferably, the flux of the oxygen-containing gas that directly enters the semi-regenerated catalyst section is 30% to 40% of the total flux of the oxygen-containing gas into the regenerator. Another function of the first distribution plate is to separate the semi-regenerated catalyst from the regenerated catalyst, so as to prevent most of the regenerated catalyst from being carried over by the gas stream moving upwards to the semi-regenerated catalyst section. It can be understood that, in the invention, the position of the first distribution plate may be appropriately adjusted or the bin level of catalyst in the regenerated catalyst section of the coke-burning zone may be controlled, so as to control the amount of the catalyst that enters the semi-regenerated catalyst section from the regenerated catalyst section. Therein, by controlling the position of the first distribution plate or controlling the bin level of catalyst in the regenerated catalyst section to intentionally supply some catalyst from the regenerated catalyst section to the semi-regenerated catalyst section, and the temperature in the semi-regenerated catalyst section may be suitably raised.

According to a specific embodiment of the invention, in the method of the invention, a second distribution plate may be further provided when necessary in the semi-regenerated catalyst section of the coke-burning zone of the regenerator and above the inlet of the spent catalyst. The second distribution plate may be a perforated partitioning plate or a grid, or other forms plates. The main function of the second distribution plate is by being appropriately positioned to further clearly divide the semi-regenerated catalyst section into an upper sub-section and a lower sub-section, i.e., the first and second half-regeneration sections, wherein the first half-regeneration section is below the second half-regeneration section (i.e. the second half-regeneration section is at the upper part of the coke-burning zone) so that the catalyst and gas from the first half-regeneration section uniformly move upwards and enter the second half-regeneration section, to improve the reaction effect at the upper part. In addition, in the method of the invention, a part of the oxygen-containing gas may be introduced by a second gas distributor to directly enter the upper part of the semi-regenerated catalyst section when necessary. Preferably, the flux of this part of oxygen-containing gas is less than or equal to 10% of the total flux of the oxygen-containing gas into the regenerator.

According to a preferred embodiment of the invention, in the method of the invention, with respect to 100% of the total flux of the oxygen-containing gas blown into the regenerator, the flux of the oxygen-containing gas that directly enters the regenerated catalyst section from the bottom of the coke-burning zone is about 50% to 60%, the flux of the oxygen-containing gas that directly enters the semi-regenerated catalyst section from the bottom of the semi-regenerated catalyst section is about 30% to 40%, and the flux of the oxygen-containing gas that directly enters the upper half of the semi-regenerated catalyst section is about 0 to 10%. Each part of gas can be introduced into the regenerator by a gas distributor, and specific selections for the gas distributor can be found in the art and the detailed description thereof is omitted here. Therein, the distributor used to directly introduce gas from the bottom of the semi-regenerated catalyst section (i.e. the first gas distributor) and the gas distributor used to directly introduce gas into the upper half of the semi-regenerated catalyst section (i.e. the second gas distributor) should be arranged following the principle that they do not affect the passage of materials through the distribution plates, and the gas distributors may be arranged below or above the respective distribution plates. Preferably, the gas distributors are arranged below the distribution plates.

According to a specific embodiment of the invention, in the method of the invention, the inside of the catalyst mixing section of the reactor is designed as a dense phase fluidized bed, and the gas apparent velocity of the catalyst fluidized bed is 0.2 to 0.6 m/s. An internal catalyst-circulating conduit is provided inside the catalyst mixing section, so that the catalyst in the mixing section is circulated between the conduit and the fluidized bed in the mixing section.

According to a specific embodiment of the invention, in the method of the invention, a spent-catalyst returning pipe is further provided between the steam stripping section of the reactor and the catalyst mixing section at the bottom of the reactor, to return part of the spent catalyst to the catalyst mixing section. Preferably, this embodiment is carried out in the case where the semi-regenerated catalyst which flows out from the regenerator only enters the reactor from location above the feedstock oil inlets of the reactor to participate in the catalytic cracking reaction, but is not introduced into the catalyst mixing section at the bottom of the reactor.

In general, the reaction-regeneration method for catalyst according to the present invention is used for the catalytic reaction process of petroleum hydrocarbons feedstock, in which double catalyst circulation of regenerated catalyst and semi-regenerated catalyst comes true between a reactor and a regenerator. According to the requirements of reaction, the regenerator simultaneously provides differently regenerated catalysts for the reactor, so that the thermal cracking reaction, especially the thermal cracking reaction in the vaporization and cracking reaction zones, can be reduced, the thermal equilibrium between vaporization and the reaction zones can be regulated, and multi-site control of the catalyst in each reaction zones can be conveniently and flexibly achieved. The reaction-regeneration method for catalytic cracking reaction comprises the following aspects (for convenience, the following description is made with reference to a countercurrent coke-burning regenerator for three-section regeneration, wherein in the direction of the spent catalyst entering the regenerator, the first section is set at the middle part of the coke-burning zone, the second section is set at the upper part of the coke-burning zone, and the third section of the regenerator is set at the bottom part of the coke-burning zone; the first and second sections are the semi-regenerated catalyst section, or the first section is called the lower part (lower sub-section) of the semi-regenerated catalyst section while the second section is called the upper part (upper sub-section) of the semi-regenerated catalyst section; and the third section is the regenerated catalyst section. It can be understood that these sections are not divided by strictly trisecting the coke-burning zone in the height direction, and do not have definite boundaries between sections; and especially when a second distribution plate is not provided between the middle section and the upper section of the semi-regenerated catalyst section, the middle and upper sections as a whole can be called as a middle-upper section or directly called as the semi-regenerated catalyst section):

1) the catalyst flows into the reactor from the regenerator in such a manner that the regenerated catalyst at the bottom of the coke-burning zone of the regenerator enters the catalyst mixing section below the feedstock oil inlets of the reactor;

the semi-regenerated catalyst from the semi-regenerated catalyst section, which may be the first or second section described above, in the coke-burning zone of the regenerator enters the catalyst purifying or stripping and cooling device first, where it is cooled to a required temperature, and the gaseous medium carried by the catalyst is released by displacement, and then: the semi-regenerated catalyst enters the reactor from above the feedstock oil atomizing nozzle (for example, enters the reactor immediately after vaporization of the feedstock oil) to participate in the catalytic cracking reaction, or the semi-regenerated catalyst enters the catalyst mixing section at the bottom of the reactor, is mixed with the regenerated catalyst to form a catalyst colder than the regenerated catalyst, and then the formed catalyst participates in the vaporization and reaction of the feedstock oil, or alternatively, the semi-regenerated catalyst from the semi-regenerated catalyst section (the first or second section) set in the coke-burning zone of the regenerator enters the catalyst purifying and cooling device first, where it is cooled to a required temperature and the gaseous medium carried by the catalyst is released by displacement, and then the resultant is split into two streams to respectively enter the reactor from above the feedstock oil atomizing nozzle and enter the catalyst mixing section at the bottom of the reactor to participate in the vaporization and the catalytic cracking reaction of the feedstock oil;

the regenerated and semi-regenerated catalysts after undergoing the reaction in the reactor, i.e. the spent catalysts, are subjected to gas-solid separation in the settler, then enter the steam stripping section to undergo steam stripping. The stripped spent catalysts then enter the regenerator for regeneration and restoration of catalyst activity.

2) a part of the spent catalysts in the steam stripping section returns to the catalyst mixing section at the bottom of the reactor via a spent-catalyst returning pipe, or the semi-regenerated catalyst from the semi-regenerated catalyst section (the first or second section) in the coke-burning zone of the regenerator enters the catalyst purifying and cooling device first, where it is cooled to a required temperature and the gaseous medium carried by the catalyst is released by displacement, and then the semi-regenerated catalyst enters the catalyst mixing section at the bottom of the reactor; the returned spent catalyst or the purified cooled semi-regenerated catalyst is mixed with the regenerated catalyst from a regenerated-catalyst standpipe, to form a catalyst cooler than the regenerated catalyst, and the formed catalyst flows upwards under the action of a pre-lift medium to contact and vaporize the feedstock oil and catalyze the catalytic cracking reaction after the vaporization, then the catalyst is subjected to gas-solid separation in the settler and enters the steam stripping section; the amount of the returned spent catalyst or the purified cooled semi-regenerated catalyst is controlled according to the required catalyst mixing temperature in the mixing section.

3) the reaction feedstock is atomized via the atomizing nozzle, then enters the vaporization zone of the reactor, comes into contact with the catalyst mixture from the catalyst mixing section at bottom. The feedstock oil is vaporized by absorbing the heat from the catalyst; the vaporized oil vapor and the catalyst are immediately and selectively mixed with the semi-regenerated catalyst from the purifying and cooling device to undergo gas-phase cracking reaction in a new catalytic environment.

4) at the bottom of the reactor is provided a catalyst mixing section having a diameter greater than that of the cracking reaction section of the riser is provided to thoroughly mix the catalyst coming from the regenerated-catalyst standpipe and the spent-catalyst returning pipe or the purifying and cooling device; the inside of the catalyst mixing section is designed as a dense-phase fluidized bed, and the gas apparent velocity of the catalyst fluidized bed is 0.2 to 0.6 m/s; The pre-lift medium enters the reactor at the bottom the catalyst mixing section to thoroughly mix the catalyst and meanwhile transport the catalyst; In addition, an internal catalyst-circulating conduit may be further provided inside the catalyst mixing section, so that the catalyst in the mixing section is circulated between the conduit and the fluidized bed in the mixing section, to improve the mixing effect.

5) preferably, the catalyst purifying and cooling device includes a catalyst cooling portion and a carried-gas stripping portion; A heat-exchange tube is provided in the catalyst cooling portion, so that the cooling medium is circulated inside the tube and the catalyst is outside the tube; the catalyst enters the purifying and cooling device from the inlet pipe and is discharged to the reactor via a transporting pipe; steam or nitrogen gas serves as the stripping medium which enters the purifying and cooling device at the bottom, and the steam stripping medium and the gas carried by the catalyst are discharged at the top.

6) after reaction, the catalyst and the product gas of reaction in the reactor are separated by a gas-solid separator, the product gas of reaction enters a fractionation column, and the catalyst enters the steam stripping section for stripping, the stripped spent catalyst returns to the regenerator via the spent-catalyst standpipe for regeneration, and turns into regenerated catalyst and semi-regenerated catalyst which then return to the reactor to participate in the reaction.

7) after the carried hydrocarbons is stripped in the steam stripping section, via the spent-catalyst standpipe, the spent catalyst enters the first section of the regenerator provided in the regenerator (i.e. enters the regenerator from the lower part of the semi-regenerated catalyst section), and reacts with the oxygen-containing gas coming from the lower regenerated catalyst section (the third section of the regenerator); under the action of gas, the catalyst moves upwards and enters the uppermost second section of the regenerator (the upper part of the semi-regenerated catalyst section) to continue the catalyst regeneration; semi-regenerated catalyst is formed in the first and second sections of the regenerator; and the flue gas moves upwards and enters the dilute phase section, from which the catalyst is separated by a gas-solid separator, and is discharged via the flue gas pipe; the semi-regenerated catalyst in the second section returns to the lowest third section of the regenerator via a semi-regenerated catalyst returning pipe and is regenerated into regenerated catalyst; the regenerated catalyst enters the catalyst mixing section at the bottom of the reactor via the regenerated-catalyst standpipe; a part of the semi-regenerated catalyst is directed out of the upper first and second sections of the regenerator and enters the reactor after being processed in the catalyst purifying and cooling device.

8) furthermore, the reaction inside the regenerator is described below in conjunction with the gas in the regenerator of the present invention: in the third section of the regenerator, i.e. the bottom part of the coke-burning zone, low-carbon catalyst reacts with oxygen-rich fresh air; the catalyst in the first section of the regenerator and the oxygen-containing flue gas are together transported upwards by the gas medium and enter the second section of the regenerator, and continue to undergo regeneration in a state of a dense phase fluidized bed to form semi-regenerated catalyst; the semi-regenerated catalyst enters the lowest third section of the regenerator via a returning pipe and is regenerated upon contact with oxygen-rich fresh air to yield regenerated catalyst; the compressed air enters the third section of the regenerator from the bottom to form an oxygen-rich and low-carbon condition; part of the regeneration air directly enters the first and second sections of the regenerator; the regenerated catalyst and semi-regenerated catalyst are directed out of the third and second sections of the regenerator, respectively, to participate in the reaction in the reactor and form circulation of regenerated catalyst and semi-regenerated catalyst; the flue gas in the regenerator moves upwards to the dilute phase zone, in which the catalyst is separated in a gas-solid separator, and is discharged via a flue gas pipe.

In the reactor of the present invention, when the temperature of the catalyst that enters at a position above the feedstock oil inlets is higher than the temperature at the reactor outlet, the heat required by the vaporization and reaction in the present invention is provided in two parts, wherein one part is provided by the catalyst in the catalyst mixing section below the vaporization zone, and the other part is provided by the semi-regenerated catalyst that enters after the vaporization. Preferably, the temperature of the catalyst that enters after vaporization of feedstock oil may be higher than the temperature at the outlet of the reactor, so that this part of catalyst provides some part of heat for the reaction.

According to an embodiment of the present invention, a heat exchange tube is provided at the upper part in the catalyst zone of the catalyst purifying and cooling device of the present invention, the reactants or feedstock oil are heated in the heat exchange tube while the catalyst is cooled, and the heated reactants or feedstock oil enter the reactor; or steam is generated in the heat exchange tube; a gas displacement or stripping zone for the gas carried by the catalyst is provided at the lower part in the catalyst purifying and cooling device.

According to the embodiment of the present invention, after feedstock oil is vaporized, the entire gas phase reaction zone of the reactor of the present invention serves as a riser reactor, or a reaction section with an enlarged diameter is provided above the inlet of the cooled purified catalyst where the cracking of the feedstock oil has continued for a reaction period of 0.8 to 1.5 seconds; in the reaction section with an enlarged diameter, the gas phase flow velocity is 1.8 m/s to 4.0 m/s, and the reaction time is 3.0 to 5.5 seconds.

According to an embodiment of the present invention, each section of the regenerator of the present invention adopts the condition of a fast fluidized bed, the gas superficial velocity in the semi-regenerated catalyst section of the coke-burning zone is 0.6 to 2.5 m/s (if the semi-regenerated catalyst section is further divided into two sub-sections, preferably, the gas superficial velocity in the first section located at the lower part of the semi-regenerated catalyst section is controlled at between 1.2 and 2.5 m/s, and the gas superficial velocity in the upper part of the semi-regenerated catalyst section is controlled between 0.6 and 1.2 m/s), and the gas superficial velocity in the regenerated catalyst section of the coke-burning zone is 0.6 to 1.2 m/s. In other words, for the three-section regenerator described above, the gas superficial velocity in the first section is 1.2 to 2.5 m/s, the gas superficial velocity in the second section is 0.6 to 1.2 m/s, and the gas superficial velocity in the third section is 0.6 to 1.2 m/s. The velocity can be adjusted based upon the requirement by changing the diameter of the device, or the diameter can be determined based on the required velocity.

According to an embodiment of the present invention, most of the semi-regenerated catalyst that enters the reactor has a carbon content of 0.10 to 0.5 wt %. Preferably, the carbon content of the semi-regenerated catalyst in the upper part of the regenerator (i.e. the second section of the three-section regenerator) is controlled at 0.15 to 0.4 wt %.

According to an embodiment of the present invention, in the method of the present invention, the temperature of the semi-regenerated catalyst section of the coke-burning zone of the regenerator is controlled between 650° C. and 720° C. (if the semi-regenerated catalyst section is further divided into two sub-sections, preferably, the temperature of the first section located at the lower part is controlled between 650° C. and 690° C., and the temperature of the second section located at the upper part is controlled between 660° C. and 720° C.), and the temperature of the regenerated catalyst section is controlled between 640° C. and 700° C.

According to an embodiment of the present invention, in the method of the present invention, the amount of the semi-regenerated catalyst or spent catalyst that enters the catalyst mixing section of the reactor is 10% to 100%, preferably 20% to 100% of the amount of the regenerated catalyst.

According to an embodiment of the present invention, in the method of the present invention, the amount of the semi-regenerated catalyst that enters the reactor at a position above the feedstock oil inlets of the reactor, where the feedstock oil is vaporized, is 10% to 50% of the amount of the regenerated catalyst that enters the reactor.

According to an embodiment of the present invention, in the method of the present invention, a catalyst mixing circulation tube is provided within the catalyst mixing section, the flux section area of this tube is preferably 10% to 40%, more preferably 10% to 30% of the flux section area of the catalyst mixing section. More preferably, the gas apparent velocity in the inner circulation tube is controlled between 1.5 m/s and 5.0 m/s.

Apparatuses used to implement the reaction-regeneration method according to the present invention are shown in FIGS. 1-3. Specifically, the present invention provides an apparatus for implementing the reaction-regeneration method, including a regenerator, a reactor, and a catalyst purifying and cooling device, arranged in parallel, wherein:

the regenerator is used for coke-burning regeneration of the spent catalyst fed from the reactor, and according to the inlet position or distribution of the fed spent catalyst and the coke-burning degree, the coke-burning zone of the regenerator is divided into a semi-regenerated catalyst section and a regenerated catalyst section, wherein the regenerated catalyst section is located below the semi-regenerated catalyst section, and a spent catalyst inlet is provided in the lower part of the semi-regenerated catalyst section; and wherein the regenerator is provided with a returning pipe which introduces the semi-regenerated catalyst from the semi-regenerated catalyst section of the coke-burning zone to the regenerated catalyst section;

the reactor has a riser reaction section as the main part, a catalyst mixing section with a enlarged diameter is provided at the bottom of the reactor, and a feedstock oil inlets of the reactor is provided between the catalyst mixing section and the riser reaction section, wherein above the feedstock oil inlets are a feedstock oil vaporization zone and a catalytic cracking reaction zone in this order, and a settler is provided downstream of the catalytic cracking reaction zone;

between the reactor and the regenerator, a spent-catalyst standpipe is provided to introduce the spent catalyst from the reactor steam stripping section to lower portion of the semi-regenerated catalyst coke-burning zone of the regenerator, and a regenerated-catalyst standpipe is provided to introduce the regenerated catalyst from the regenerator to the catalyst mixing section of the reactor;

between the regenerator and the catalyst purifying and cooling device, a semi-regenerated-catalyst transporting pipe is provided for the semi-regenerated catalyst flowing from the regenerator to the catalyst purifying and cooling device; between the catalyst purifying and cooling device and the reactor, a semi-regenerated-catalyst feeding pipe is provided to feed the semi-regenerated catalyst in the catalyst purifying and cooling device to the reactor from above the reaction feedstock oil inlets, and another semi-regenerated-catalyst feeding pipe is provided to feed the semi-regenerated catalyst in the catalyst purifying and cooling device to the catalyst mixing section at the bottom of the reactor.

In an embodiment of the present invention, the task of the present invention is accomplished in the following manner:

a regenerator, a reactor, and a catalyst purifying and cooling device are arranged in parallel; the regenerated catalyst from the third section of the regenerator enters the catalyst mixing section of the reactor from below the feedstock nozzle via a regenerated-catalyst standpipe, is stripped in the steam stripping section after reaction, and then returns to the regenerator; the semi-regenerated catalyst from the second section of the regenerator is treated in the catalyst purifying and cooling device and then enters the reactor at a position where the feedstock oil has been vaporized to participate in the cracking reaction; the temperature of the cooled catalyst is controlled according to the temperature of the post-vaporization thermometric point set in the reactor or according to the temperature difference from the temperature of the post-vaporization thermometric point set in the reactor, or the temperature of cooled semi-regenerated catalyst is controlled according to the temperature at the outlet of the reactor or according to the temperature difference from the temperature at the outlet of the reactor; the catalyst in the catalyst purifying and cooling device is then steam-stripped to remove the carried oxygen and other gas, and is fed via a transporting pipe by gravity into the reactor at a position where the feedstock oil has been vaporized, to participate in the cracking reaction of the feedstock oil, and the spent catalyst returns to the regenerator after the reaction; steam or nitrogen enters the catalyst purifying and cooling device from the bottom of the catalyst purifying and cooling device, moves upwards through the purifying or stripping section and the cooling zone, and is discharged at the top via a gas discharging pipe; a part of the spent catalyst in the purifying or stripping section returns to the catalyst mixing section located at the bottom of the reactor via a spent-catalyst returning pipe, and is thoroughly mixed with the regenerated catalyst so that the temperature of the regenerated catalyst is lowered and the catalyst-to-oil ratio in the feedstock oil vaporization zone is increased; depending on varieties of feedstock, the amount of returned spent catalyst is 0.1 to 1.0 times of the amount of the regenerated catalyst; or, the semi-regenerated catalyst from the second section of the regenerator is treated in the catalyst purifying and cooling device, and then enters the reactor both at the catalyst mixing section located at the bottom of the reactor and at a position where the feedstock oil has been vaporized.

The temperature of the catalyst below the feedstock inlets of the reactor is controlled by the amount of the spent catalyst or the low-temperature semi-regenerated catalyst; the reaction temperature after vaporization of the reaction feedstock is controlled by the slide valve of the regenerated-catalyst standpipe; or the temperature at the outlet of the reactor is controlled by the slide valve of the regenerated-catalyst standpipe; the temperature of the catalyst in the catalyst mixing section varies depending on the reaction feedstock, and is generally between 620° C. and 660° C.

About 60% of the compressed air for catalyst regeneration enters the third section of the regenerator, and about 40% (preferably 30% to 40%) of the rest of the compressed air enters the first section of the regenerator to participate in regeneration of the spent catalyst.

Compared to the prior art, the present invention has the following advantages:

1) through the circulation of the spent catalyst, the method increases the circulating amount of the catalyst (i.e. the catalyst-to-oil ratio) of the reactor itself without changing the thermal equilibrium between the reaction and the regeneration, and without changing the coke difference in the regenerator;

2) when the temperature of the catalyst that enters from above the feedstock oil inlets is higher than the temperature at the outlet of the reactor, the heat supply to the reactor can be provided in stage, with part of the reaction heat (preferably 50% to 10% of the reaction heat) being provided after vaporization of feedstock oil, so that the temperature of catalyst contacting with feedstock oil and vaporizing feedstock oil is conveniently adjusted, the excess heat in the vaporization and contact area is reduced, and the degree of thermal cracking in this zone is restricted to reduce thermal cracking products;

3) in addition to supplying low-temperature spent catalyst or semi-regenerated catalyst to the reactor below the feedstock inlets, the present invention can conveniently supply highly active catalyst in coordination with the reaction temperature to the gas-phase cracking reaction zone, increase the catalyst activity and the catalyst-to-oil ratio in the gas-phase reaction zone, and can achieve higher catalyst circulation (i.e. higher catalyst-to-oil ratio) when the amount of heat supplied does not change, because the temperature of the catalyst entering the cracking reaction zone of the reactor is lower than that of the regenerated catalyst and the same amount of heat supplied needs more catalyst;

4) the method of the present invention purifies a part of the semi-regenerated catalyst that enters the reactor, displaces the carried oxygen and nitrogen and the gas from the regenerator, avoids the impact of these gases on the reaction, and reduces the load of the rich gas compressor and energy consumption;

5) the regenerator of the present invention simultaneously provides differently conditioned catalysts for different reactions, achieves simultaneous circulation of regenerated catalyst and semi-regenerated catalyst, and provides multiple catalyst choices for regeneration and reaction;

6) the present inventions realizes multi-section counter-flow regeneration, increases regeneration efficiency, may lower the catalyst inventory of the regenerator, and reduces excessive oxygen content.

DESCRIPTION OF THE REFERENCE NUMBERS IN THE FIGURES

Figure 1:
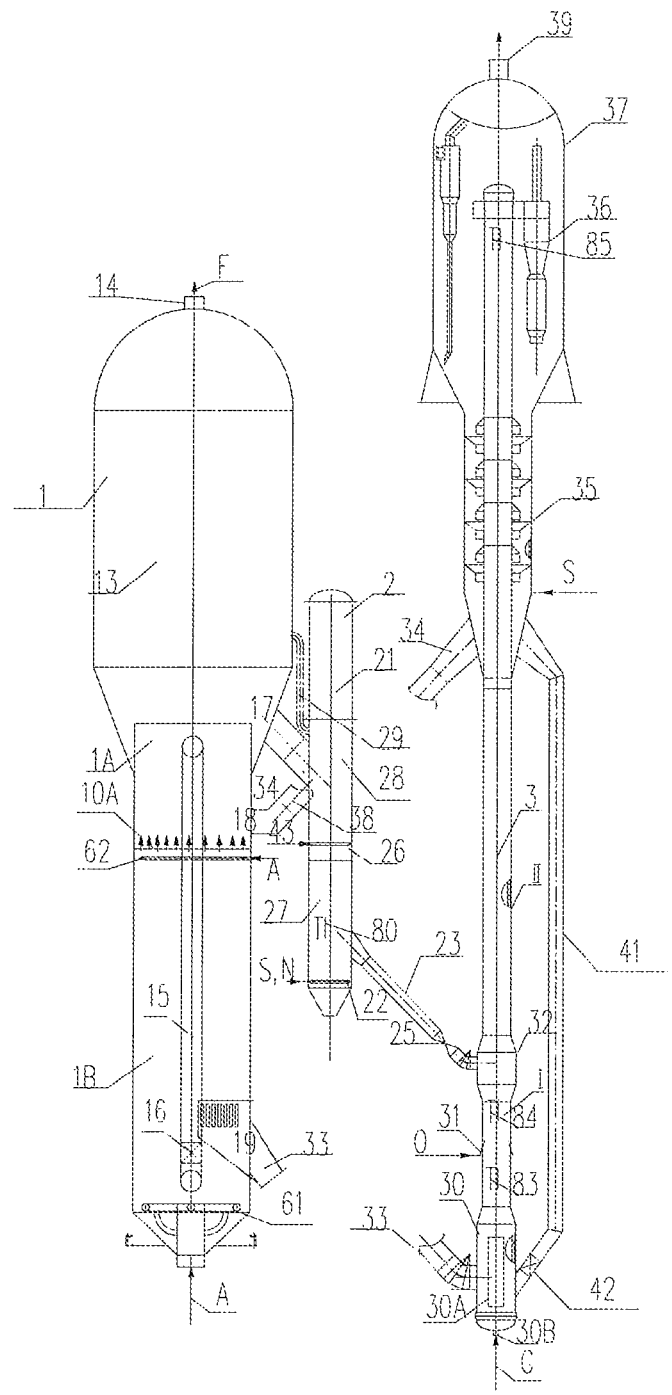
FIG. 1 is a structure schematic representation of the part of the reactor-regenerator for the catalytic cracking reaction process according to one embodiment of the present invention.

I: Vaporization zone of reactor where feedstock and catalyst contact; II: Gas-phase catalytic cracking reaction zone of reactor; IIA: Reaction zone with enlarged diameter; 1: Regenerator; 2: Catalyst purifying or stripping and cooling device; 3: Reactor; 5: External catalyst cooler; 1A: Semi-regenerated catalyst section; 1B: Regenerated catalyst section; 10: First section of regenerator (Middle section of coke-burning zone, First half-regeneration section,); 10A: First distribution plate (perforated partitioning plate); 10B and 11B: Gas and catalyst rising holes; 11: Second section of regenerator (Upper section of coke-burning zone, Second half-regeneration zone); 11A: Second distribution plate (perforated partitioning plate); 10C and 11C: Hole lids of distribution plate; 12: Third section of regenerator (Lower section of coke-burning zone); 13: Dilute phase section of regenerator; 14: Flue gas outlet; 15: Semi-regenerated catalyst returning pipe (Returning pipe); 16: Slide valve of semi-regenerated catalyst returning pipe; 17: Semi-regenerated catalyst outlet; 18: Spent-catalyst inlet; 19: Regenerated-catalyst outlet; 51: Gas outlet tube of external catalyst cooler; 52: Gas distributor; 53: Catalyst outlet tube of external catalyst cooler; 54: Slide valve; 21: Water-steam separator; 22: Gas distributor for gas carried by the catalyst purifying or stripping in catalyst purifying or stripping and cooling device; 23 and 23A: Catalyst transporting pipes; 25: Slide valve of catalyst transporting pipe of purifying or stripping and cooling device; 26: Fluidizing gas distributor for catalyst temperature control in catalyst purifying and cooling device; 27: Steam stripping section of catalyst purifying and cooling device; 28: Cooling zone of catalyst purifying and cooling device; 29: Gas-discharge pipe of catalyst purifying and cooling device; 30: Catalyst mixer and riser (Catalyst mixing section); 30A: Catalyst mixing and circulating pipe; 30B: Pre-lift medium inlet; 31: Feedstock nozzle; 32: Catalyst distributor; 33: Regenerated-catalyst standpipe; 34: Spent-catalyst standpipe; 35: Steam stripping section; 36: Cyclone separator; 37: Settler; 39: Reaction product outlet; 38: Regeneration slide valve; 41: Spent-catalyst returning pipe; 42: Slide valve; 43: Fluidizing gas of purifying and cooling device; 61: Third gas distributor; 62: First gas distributor; 63: Second gas distributor; 80: Temperature of catalyst at outlet of catalyst purifying and cooling device; 83: Temperature of catalyst mixture in catalyst mixing section; 84: Temperature of vaporized feedstock oil; 85: Temperature at reactor outlet; 81: Temperature difference; A: Compressed air; C: Catalyst; F: Flue gas; S: Steam; G: Pre-lift medium; O: Feedstock oil for reaction; N: Nitrogen gas.

DETAILED DESCRIPTION OF INVENTION

The technical solutions according to the present invention will be described in detail in conjunction with the figures and Examples. However, the scope of protection of the present invention is not limited thereto. All apparatus configurations not fully described herein can be those conventional in the art.

Figure 2:
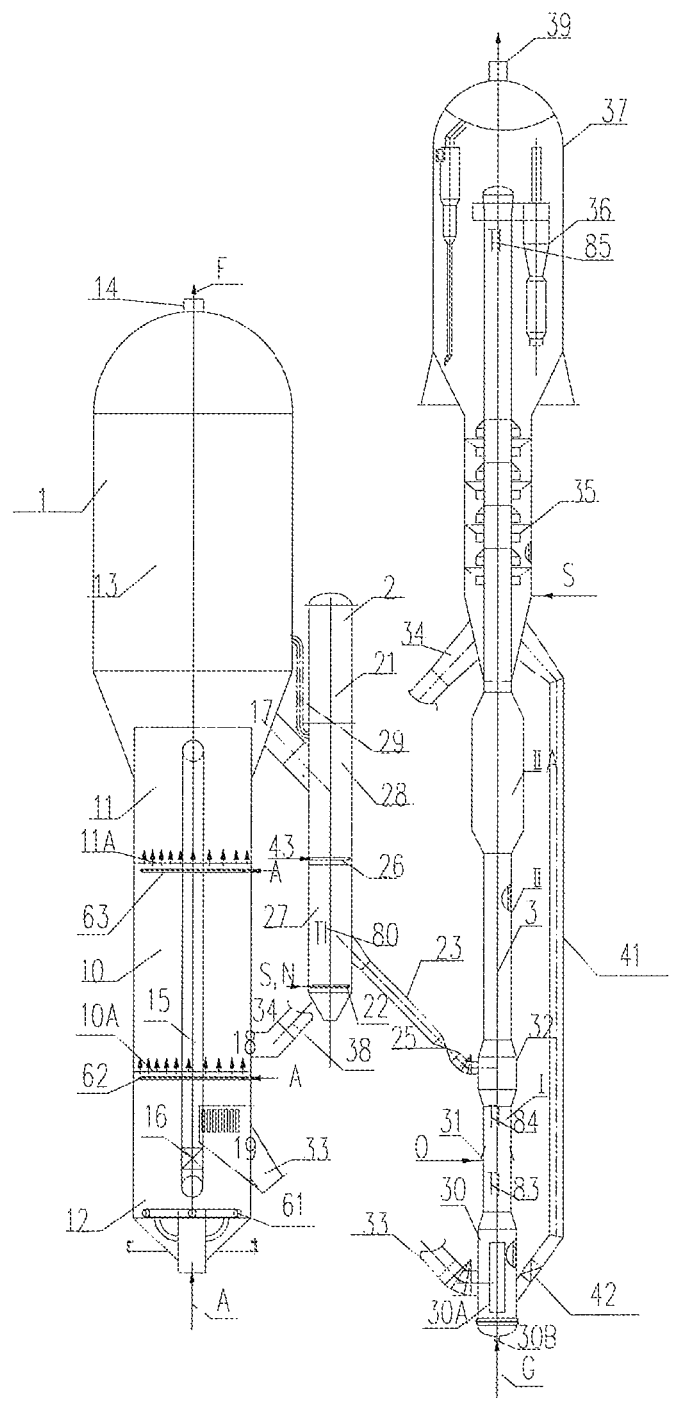
FIG. 2 is a structure schematic representation of the part of the reactor-regenerator according to another embodiment of the present invention.
Figure 3:
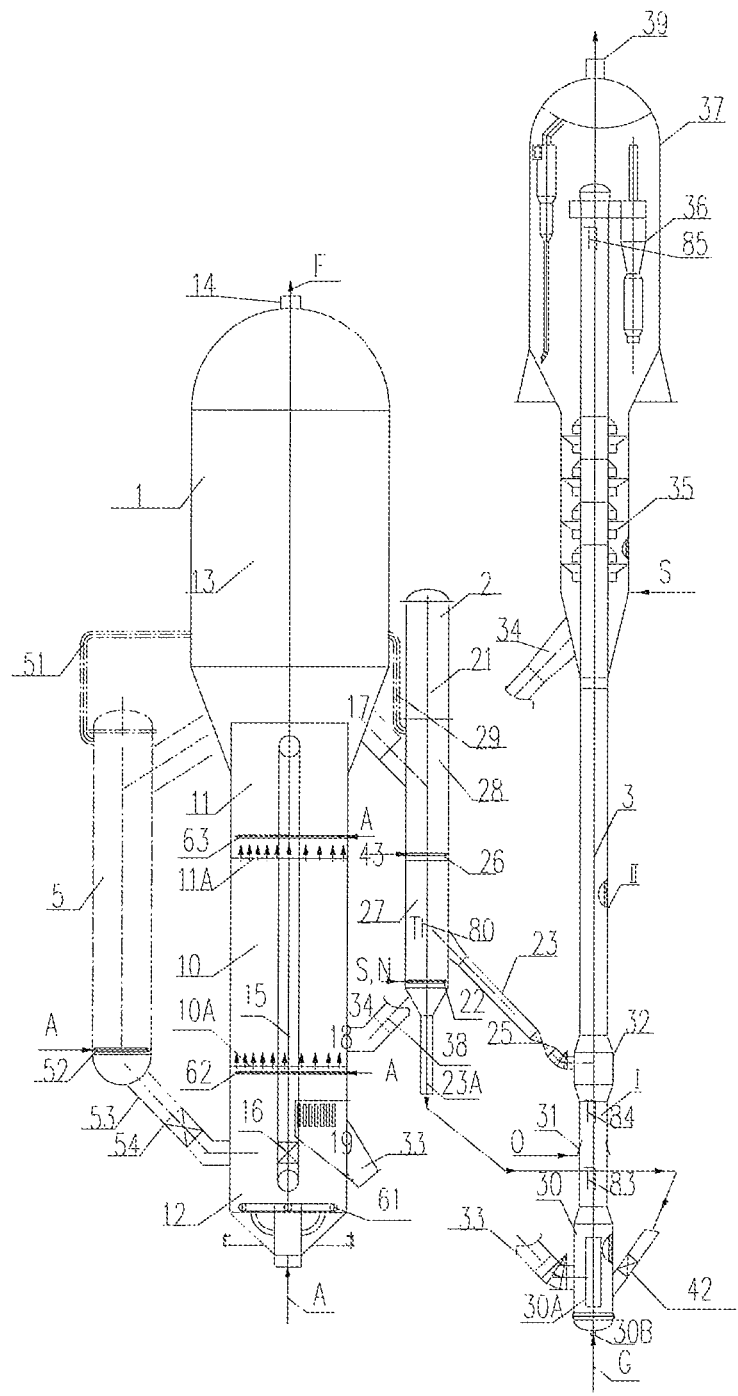
FIG. 3 is a structure schematic representation of the part of the reactor-regenerator according to another embodiment of the present invention.

With reference to FIGS. 1 to 3, the apparatus for implementing the reaction-regeneration method of the present invention includes a regenerator 1, a catalyst purifying and cooling device 2 and a reactor 3 arranged in parallel, wherein: the regenerator 1 is used for coke-burning regeneration of the spent catalyst from the reactor 3, a first distribution plate 10A is provided below the spent-catalyst inlet 18 in the coke-burning zone of the regenerator 1, to divide the coke burning zone into a semi-regenerated catalyst section 1A above the first distribution plate and a regenerated catalyst section 1B beneath the first distribution plate. The spent-catalyst inlet 18 is typically located in the lower part of the semi-regenerated catalyst section. The position of the first distribution plate 10A in the coke-burning zone may be adjusted according to the coke-burning degree and the catalyst bed level in the semi-regenerated and regenerated catalyst sections, and may be set at above the mid-level of the coke-burning zone (as shown in FIG. 1) or at below the mid-level of the coke-burning zone (as shown in FIGS. 2 and 3). Furthermore, as shown in FIGS. 2 and 3, in the semi-regenerated catalyst section of the coke-burning zone of the regenerator, a second distribution plate 11A may be provided above the spent-catalyst inlet 18 to further divide the semi-regenerated catalyst section clearly into two sub-sections one atop another, i.e. the first half-regeneration section 10 and the second half-regeneration section 11 above the first half-regeneration section 10. In addition, in the regenerator a returning pipe 15 is provided to introduce the semi-regenerated catalyst from the semi-regenerated catalyst section of the coke-burning zone to the regenerated catalyst section.

Figure 4:
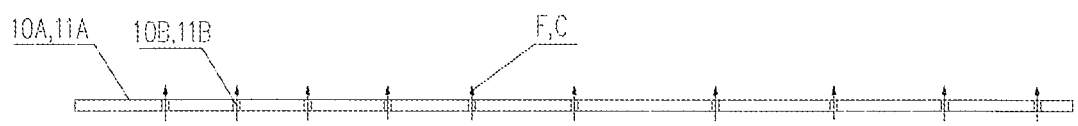
FIG. 4 is a structure schematic representation of one embodiment of the distribution plate in the coke-burning zone according to the present invention.
Figure 5:
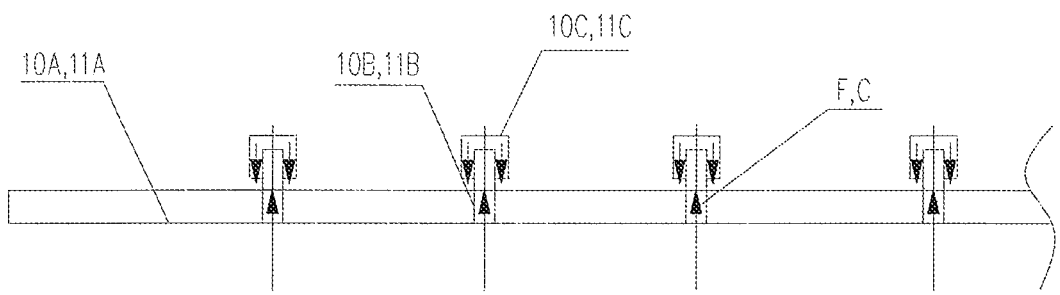
FIG. 5 is a structure schematic representation of another embodiment of the distribution plate in the coke-burning zone according to the present invention.

The regenerator based on three-section coke-burning regeneration as shown in FIGS. 2 and 3 will be exemplarily described below. With reference to the catalytic cracking reactor-regenerator apparatus shown in FIGS. 2 and 3, the regenerator works by three-section coke-burning regeneration, wherein the three sections refer to the upper, middle and lower sections resulting from spatial dividing of the coke-burning zone of the regenerator, and are partitioned with distribution plates between one another. The first and second distribution plates 10A and 11A are provided in the coke-burning zone. The part of the coke-burning zone below the first distribution plate 10A may be defined as the lower section or the regenerated catalyst section, the part of the coke-burning zone above the second distribution plate may be defined as the upper section or the upper half-regeneration section, and the part of the coke-burning zone between the first and second distribution plates 10A and 11A may be defined as the medium section or the lower half-regeneration section. The detailed structure of the first and second distribution plates 10A and 11A can be seen in FIGS. 4 and 5, and they may be a normal perforated partitioning plate as shown in FIG. 4 where a number of gas and catalyst rising holes 10B and 11B serving as flowing channels for flue gas F and catalyst C are provided in the partitioning plate, or may be as shown in FIG. 5 wherein hole lids 10C and 11C of distribution plates are further provided over the gas and catalyst rising holes 10B and 11B so as to adjust the distribution of the gas and catalyst.

With reference to FIGS. 2 and 3 again, the three-section regenerator and the dilute phase section 13 of the regenerator are coaxially arranged one atop another, and according to the inlet position and flowing direction or distribution of the spent catalyst in the regenerator, the first section 10 of regenerator is set at the middle section of the coke-burning zone, the second section 11 of regenerator is set at the upper part of the coke-burning zone, and the third section 12 of regenerator is set at the lower part of the coke-burning zone. Spent catalyst enters the first section of regenerator to react with the oxygen-containing gas from the third section and the first gas distributor 62. The catalyst and the gas are together transported upwards through the second distribution plate to the second section of regenerator to continue the regeneration, and the catalyst in the second section enters the third section of regenerator via a catalyst returning pipe. Oxygen-rich fresh air enters the third section from the bottom via the third gas distributor 61, and reacts with the low-carbon semi-regenerated catalyst from the semi-regenerated catalyst coke-burning zone, generally the third section of regenerator, to complete the regeneration of catalyst. About 50% to 60% of the compressed air enters the third section via the third gas distributor 61 to participate in the reaction in the third section of regenerator, about 30% to 40% of the compressed air enters the first section via the first gas distributor 62 to participate in the reaction, and 0% to 10% of the compressed air enters the second section of regenerator via the second gas distributor 63. The third section of regenerator operates in a dense-phase fluidized bed state (optimally, the gas superficial velocity of the dense-phase fluidized bed is 0.5 m/s to 1.2 m/s).

The reaction-regeneration method of the present invention provides differently generated catalysts for the reactor. Regenerated catalyst exits the third section 12 of regenerator (i.e. the coke-burning zone of regenerated catalyst), and enters the catalyst mixing section 30 at the bottom of the reactor via a regenerated-catalyst standpipe 33 right below the reaction feedstock inlet (feedstock nozzle 31) of the reactor 3; meanwhile, spent catalyst, or purified and cooled semi-regenerated catalyst from the second section of regenerator, enters the catalyst mixing section 30. The catalyst mixing section 30 has a diameter 1.5 to 2.5 times the diameter of the cracking section of the reactor, operates under a dense-phase fluidized bed condition to uniformly fluidize catalyst, and has a catalyst mixing and circulating pipe 30A provided inside it and having a cross-section area 10% to 40%, preferably 10% to 30% of that of the catalyst mixing section. Catalyst is internally circulated inside the catalyst mixer to be uniformly mixed. The catalyst in the catalyst mixing section provides all the vaporization heat and part of the reaction heat for feedstock, and the amount of the catalyst is used to adjust the reaction temperature in the reactor. A spent catalyst returning pipe 41 may be provided between the steam stripping section 35 and the catalyst mixing section 30 at the bottom of the reactor, so that a part of spent catalyst is returned to the catalyst mixing section to be mixed with regenerated catalyst. Because this spent catalyst's temperature is much lower than the temperature of regenerated catalyst, the returned amount of the spent catalyst can be used to adjust the catalyst temperature before contact with feedstock oil and the temperature difference between catalyst and feedstock oil upon their contact. The returned spent catalyst is only circulated in the reaction system, and does not alter the catalyst circulation between the reactor 3 and regenerator 1.

According to the present invention, the semi-regenerated catalyst from the second section 11 of regenerator is cooled in the catalyst purifying and cooling device 2, and after its temperature is controlled as required (generally 480° C. to 570° C. in the present invention) and the carried gas medium is released by displacement or stripping, enters the reactor 3 at a position where feedstock oil has been vaporized to participate in the reaction in the cracking reaction zone, so that the reaction catalyst-to-oil ratio in the reaction zone of the reactor can be further increased and independently controlled.

The present invention employs a short reaction time of 1.5 to 2.5 seconds, about a temperature of 300° C. to 360° C. for pre-heating the feedstock oil, and a catalyst-to-oil ratio of 9 to 15, so as to maximize the yield of gasoline and minimize the yield of dry gas and coke.

Furthermore, as shown in FIG. 3, the regenerator of the present invention may be provided with an external catalyst cooler 5 including related facilities such as a gas outlet tube 51 of external catalyst cooler, a gas distributor 52, a catalyst outlet tube 53 of external catalyst cooler, a slide valve 54, etc. The settings of the external catalyst cooler can be made according to conventional operations in the art and the description thereof will be omitted here.

In the present invention, an independent catalyst purifying and cooling device 2 is provided between the reactor 3 and the regenerator 1, which includes a catalyst cooling portion, a carried-gas stripping portion, a catalyst temperature controller, stripping gas adjusting and stripped gas-discharging pipelines, and catalyst inlet and outlet pipelines. The catalyst cooling portion is Installed in the upper and the stripping portion is provided below. Catalyst enters the device via one inlet pipeline, is discharged via a transportation pipe and fed into the reactor. Steam or nitrogen gas enters the device from below the stripping area, and the stripping medium and the gas carried by regenerated catalyst are discharged from gas-discharging pipelines. Then the steam or nitrogen gas enters through a regulatory valve provided in the pipeline, and the regulatory value is acted by the catalyst temperature in the catalyst purifying and cooling device or by the difference between the temperature of corresponding position in the reaction zone and the catalyst temperature in the catalyst purifying and cooling device.

In the present invention, the catalyst temperature in the catalyst purifying and cooling device is controlled according to the temperature of the vaporized stream above the feedstock inlet of the reactor, so that the catalyst entering the cracking reaction zone fits the reaction condition in the cracking reaction zone. To meet the requirements, thermometric points are set in the vaporization zone between the catalyst inlet and the reaction feed stock inlet in the cracking reaction zone of the reactor and in the catalyst purifying and cooling device. The temperature difference between these two points is taken as an indicator to control the opening degree of the control (regulatory) valve in the operation medium pipeline of the catalyst purifying and cooling device, or the temperature difference between the outlet of the reactor and the catalyst purifying and cooling device is taken as an indicator to control the opening degree of the control (regulatory) valve in the operation medium pipeline of the catalyst purifying and cooling device. The regulatory valve in turn controls the amount of operation medium entering the catalyst purifying and cooling device, to achieve interconnected control of the catalyst temperature in the catalyst purifying and cooling device and the reaction temperature in the reactor, so that the catalyst entering the cracking reaction zone of the reactor always fits the conditions in the reactor. Alternatively, the temperature in the catalyst purifying and cooling device is used as an indicator to control the opening degree of the control valve in the operation medium pipeline of the catalyst purifying and cooling device, to adjust the amount of the introduced fluidized medium and to control the outlet temperature of the catalyst purifying and cooling device.

The catalyst purifying and cooling device of the present invention uses steam or nitrogen gas as the operation medium to achieve displacement of the flue gas carried by the catalyst and to control the catalyst temperature. Alternatively, it may use air and steam as two operation media with the steam entering the catalyst purifying and cooling device below the air, wherein adjustment of the air amount may change the catalyst temperature and adjustment of the steam amount may control the catalyst temperature and the displacement effect (stripping efficiency) of the carried gas.

The catalyst from the catalyst purifying and cooling device of the present invention enters the reactor at a position above the reaction feedstock inlet with a distance over which it takes 0.1 to 0.5 seconds for the vaporized gas equivalent to flow, or at a position 1.0 to 6 meters above the reaction feedstock inlet, to participate in the reaction in the cracking reaction zone of the reactor.

A heat exchange tube is provided at the upper part inside the catalyst purifying and cooling device of the present invention. While the catalyst is cooled, the reaction feedstock is heated in the heat exchange tube and then enters the reactor; or steam is generated in the heat exchange tube. A catalyst-carried gas displacement zone is provided at the lower part inside the catalyst purifying and cooling device.

The reactor of the present invention as a whole can work as a riser reactor, or as shown in FIG. 2, a reaction section with an enlarged diameter IIA may be provided downstream of the reactor and above the inlet of the catalyst purifying and cooling device. Preferably, in the section with an enlarged diameter, the gas phase flow velocity is 1.8 m/s to 4.0 m/s, and the reaction time is 3.0 to 5.5 seconds. The reaction section with an enlarged diameter IIA is provided mainly according to the requirement for olefin conversion of gasoline.

With reference to FIG. 2 again, in the reaction and regeneration method for catalytic cracking reaction according to the present invention, the regenerated catalyst in the third section 12 of regenerator and the semi-regenerated catalyst in the second section 11 of regenerator are introduced into the reactor 3 from the regenerated-catalyst outlet 19 and the semi-regenerated catalyst outlet 17, respectively; the regenerated catalyst from the third section 12 of the regenerator 1 directly enters the catalyst mixing section 30 at the bottom of the reactor 3 via the regenerated-catalyst standpipe 33 from the regenerated-catalyst outlet 19, and flows upwards under the action of the pre-lift medium that enters via the pre-lift medium inlet 30B, so as to contact the feedstock oil to vaporize it and then complete the catalytic cracking reaction; after the reaction is completed, the hydrocarbons carried is stripped in the steam stripping section 35, and the catalyst is returned to the first section 10 of regenerator via the spent-catalyst standpipe 34. The semi-regenerated catalyst from the second section 11 of regenerator is treated in the catalyst purifying and cooling device 2, and then is fed by gravity via the catalyst transporting pipe 23 into the reactor 3 at a position of the reactor where the feedstock oil is vaporized, to participate in the cracking reaction; after the reaction is completed, the hydrocarbons carried is stripped in the steam stripping section 35, and then the catalyst is returned to the first section 10 of regenerator from the spent-catalyst inlet 18 via the spent-catalyst standpipe 34. A part of the spent catalyst in the steam stripping section 35 is returned to the catalyst mixing section 30 via the spent-catalyst returning pipe 41.

Alternatively, as shown in FIG. 3, the semi-regenerated catalyst from the second section 11 of regenerator is treated in the catalyst purifying and cooling device 2, then enters the catalyst mixing section 30 via the catalyst transporting pipe 23A, and is mixed with the regenerated catalyst to lower the temperature of the regenerated catalyst.

In the present invention, based on the temperature 83 of the catalyst mixture mixed in the catalyst mixing section below the feedstock inlet of the reactor, the slide valve 42 of the spent-catalyst returning pipe is adjusted to control the amount of the returning spent catalyst, as shown in FIGS. 1 and 2; or the slide valve 42 is adjusted to control the amount of the low-temperature semi-regenerated catalyst that enters from the catalyst purifying and cooling device, as shown in FIG. 3, so as to regulate the catalyst temperature in the catalyst mixing section. A catalyst mixing pipe 30A is provided in the catalyst mixing section to circulate the catalyst within the catalyst mixing section and improve the mixing of catalyst. The catalyst in the catalyst transporting pipe 23 of the catalyst purifying and cooling device moves downwards by gravity into the cracking reaction zone II of reactor above the feedstock oil inlet; according to the temperature difference 81 between (i) the temperature at a point between the catalyst inlet and the reaction feedstock inlet of the reactor (i.e. the temperature 84 of the vaporized feedstock oil) and (ii) the catalyst temperature 80 at the outlet of the catalyst purifying and cooling device, the operation medium 43 or steam S or nitrogen gas N in the catalyst purifying and cooling device 2 is regulated to control the catalyst temperature 80 at the outlet of the catalyst purifying and cooling device, and supply catalyst that meets the requirements to the cracking reaction zone II of reactor. Steam or nitrogen gas enters the catalyst purifying and cooling device 2 at the bottom of the catalyst purifying and cooling device 2 via the gas distributor 22, moves upwards through the stripping section 27 of catalyst purifying and cooling device and the cooling zone 28 of catalyst purifying and cooling device, and is discharged through the top gas-discharge pipe 29 of catalyst purifying and cooling device. The temperature 84 of the vaporized feedstock oil in the reactor or the outlet temperature 85 of reactor is controlled by regulating the flow of regenerated catalyst by the regeneration slide valve 38. Feedstock oil is heated upon heat exchange, then is atomized via the feedstock nozzle 31, and then enters the reactor. The semi-regenerated catalyst in the second section of the regenerator enters the third section 12 of regenerator via the returning pipe 15. Air A enters the third section 12 of regenerator, the second section 11 of regenerator and the external catalyst cooler 5, respectively. The pre-lift medium G enters the catalyst mixing section. Feedstock oil O enters the reactor via the feedstock nozzle 31. Steam S enters the steam stripping section.

EXAMPLES

The apparatus used in this example for controlling the catalyst in the reaction zone and performing the cooling method on the regenerated catalyst is shown in FIG. 3.

A petroleum hydrocarbon catalytic cracking apparatus with a capacity of $150 \times 10^4$ t/a performs regeneration with a coke-burning tank and with parallel reactor and regenerator. The riser reactor 3 and catalyst purifying and cooling device 2 produce mid-pressure steam. The catalyst purifying and cooling device 2 is equipped with a gas-liquid separator which is directly attached to the catalyst purifying and cooling device 2 and has the same diameter as the catalyst purifying and cooling device 2. The reactant materials and reaction conditions of the examples versus comparative examples representing the prior art are shown in the table below.

| Items | Examples | | Comparative Examples | |
| --- | --- | --- | --- | --- |
| | Unit | Value | Unit | Value |
| Amount of feedstock oil O | t/h | 180 | t/h | 180 |
| Density | Kg/m³ | 0.91 | Kg/m³ | 0.91 |
| Residual carbon | W % | 0.5 | W % | 0.5 |
| Feed temperature of feedstock oil O | ° C. | 330 | ° C. | 230 |
| Precooling medium G | Kg/h | 4500 | Kg/h | 4500 |
| Temperature at reaction outlet 85 | ° C. | 515 | ° C. | 500 |
| Dense phase temperature of regenerator | ° C. | | ° C. | 695 |
| Regeneration temperature of the second section | ° C. | 675 | ° C. | |
| Coke content in the semi-regenerated catalyst in the second section | % | 0.2 | | |
| Regeneration temperature of the third section | ° C. | 695 | ° C. | |
| Gas apparent velocity in the third section of regenerator | m/s | 0.9 | | |
| Gas apparent velocity in the first section of regenerator | m/s | 1.55 | | |
| Average gas superficial velocity in the second section of regenerator | m/s | 1.0 | | |
| Carbon content in the regenerated catalyst | % | 0.05 | % | 0.05 |
| Catalyst temperature in catalyst mixing | ° C. | 630 | ° C. | 690 |

-continued

| Items | Examples Unit | Value | Comparative Examples Unit | Value |
|---|---|---|---|---|
| section 30 | | | | |
| Temperature at the thermometric point for catalyst feed in the cracking reaction zone II (the temperature 84 of the vaporized feedstock oil) | ° C. | 535 | ° C. | 540 |
| Temperature difference 81 between the temperature of the second outlet of the purifying and cooling device 2 and the temperature at the thermometric point for catalyst feed in the cracking reaction zone II (the temperature 84 of the vaporized feedstock oil) | ° C. | 0 | | |
| Distance from the feedstock inlet to the catalyst feed inlet of the cracking reaction zone II | m | 2.0 | | |
| Total reaction time | s | 2.2 | s | 2.8 |
| Circulating amount of regenerated catalyst | t/h | 900 | t/h | 1224 |
| Amount of catalyst from the spent-catalyst returning pipe 41 | t/h | 450 | t/h | 0 |
| Amount of catalyst entering the cracking reaction zone II | t/h | 600 | t/h | 0 |
| Overall reaction catalyst-to-oil ratio | | 10.8 | | 6.67 |
| Amount of steam used in the catalyst purifying and cooling device | Kg/h | 980 | Kg/h | 0 |

Specifications of the reaction apparatus of the examples according to the invention and comparative examples according to the prior art are shown in the table below.

| Items | Examples Unit | Value | Comparative Examples Unit | Value |
|---|---|---|---|---|
| Diameter of the third section 12 of regenerator | mm | 5600 | mm | |
| Height of the third section of regenerator | mm | 7000 | mm | |
| Diameter of the first section of regenerator | mm | 5600 | mm | |
| Height of the first section of regenerator | mm | 9000 | mm | 16000 |
| Diameter of the second section of regenerator | mm | 6800 | mm | |
| Height of the second section of regenerator | mm | 5000 | | |
| Diameter of the dilute phase section of regenerator | mm | 9500 | mm | 9800 |
| Diameter of the catalyst mixer and pre-riser 30 of the reactor | mm | 2000 | mm | 1600 |
| Diameter of the cracking reaction zone II of reactor | mm | 1150 | mm | 1100 |
| Diameter of the catalyst distributor 32 of the cracking reaction zone II of reactor | mm | 2200 | | |
| Diameter of the semi-regenerated catalyst returning pipe | mm | 500 | | |
| Diameter of the catalyst purifying and cooling device 2 | mm | 2000 | | |
| Area of the heat exchange tube of the catalyst purifying and cooling device 2 | m² | 90 | | |
| Diameter of the regenerated catalyst inlet tube of the catalyst purifying and cooling device 2 | mm | 1100 | | |
| Diameter of the catalyst transporting pipe 23 of the catalyst purifying and cooling device | mm | 500 | | |
| Diameter of the gas-discharge pipe 29 of the catalyst purifying and cooling device | mm | 250 | | |
| Diameter of the steam inlet pipe of the catalyst purifying and cooling device 2 | mm | 200 | | |

Reaction product profiles of the examples and the comparative examples according to the prior art are shown in the table below.

| Components | Examples Unit | Value | Comparative Examples Unit | Value |
|---|---|---|---|---|
| Dry gas | W % | 2.2 | W % | 3.6 |
| Liquefied gas | W % | 12 | W % | 11.9 |
| Gasoline | W % | 52.4 | W % | 50.9 |
| Diesel | W % | 25.4 | W % | 25.4 |
| Heavy oil | W % | 1.6 | W % | 1.6 |
| Coke | W % | 6 | W % | 6.2 |
| Loss | W % | 0.4 | W % | 0.4 |
| Total | W % | 100 | W % | 100 |

The invention claimed is:

1. A reaction-regeneration method for catalytic cracking reaction, for use in the process of catalytic reaction of petroleum hydrocarbon-based feedstock, comprising:
   arranging a regenerator, a reactor, and a catalyst purifying or stripping and cooling device in parallel, wherein:
   the regenerator is used for coke-burning regeneration of a spent catalyst fed from the reactor, and the regenerator has a coke-burning zone which divided into a semi-regenerated catalyst section for semi-regenerated catalyst and a regenerated catalyst section for regenerated catalyst according to flow direction of the spent catalyst and coke-burning degree;
   the reactor has a riser reaction section as the main part, a catalyst mixing section with a enlarged diameter is provided at the bottom, and feedstock oil inlets of the reactor is located between the catalyst mixing section and the riser reaction section, wherein above the feedstock oil inlets there are a feedstock oil vaporization zone and a catalytic cracking reaction zone in this order, and a settler is provided downstream of the catalytic cracking reaction zone;

introducing the spent catalyst from the reactor into the semi-regenerated catalyst section of the coke-burning zone to contact and react with an oxygen-containing gas from below, to form the semi-regenerated catalyst, and then introducing the semi-regenerated catalyst into the regenerated catalyst section of the coke-burning zone via an returning pipe to contact and react with another oxygen-containing gas from the bottom of the coke-burning zone to accomplish the regeneration and form the regenerated catalyst;

drawing a part of the semi-regenerated catalyst out of the regenerator; introducing this part of the semi-regenerated catalyst first into the catalyst purifying or stripping and cooling device to be cooled to a required temperature and the gaseous medium carried by the catalyst is released or stripped by displacement, and then introducing the catalyst into the reactor to participate in the catalytic cracking reaction;

introducing the feedstock oil into the reactor to contact with the catalyst so as to complete vaporization and catalytic cracking reaction; and after the reaction, the spent catalyst is subjected to gas-solid separation in the settler, then enters the steam stripping section for steam stripping, and then introducing the stripped catalyst into the regenerator for regeneration.

2. The method according to claim 1, wherein providing a dilute phase section above the coke-burning zone of the regenerator, the coke-burning zone and the dilute phase section are vertically coaxially arranged.

3. The method according to claim 1, wherein providing a first distribution plate in the coke-burning zone of the regenerator and below the inlet of the spent catalyst, the first distribution plate divides the coke-burning zone into a semi-regenerated catalyst section above the first distribution plate and a regenerated catalyst section below the first distribution plate.

4. The method according to claim 3, wherein further providing a second distribution plate in the semi-regenerated catalyst section of the coke-burning zone of the regenerator, the second distribution plate is placed above the inlet of the spent catalyst, and further clearly divides the semi-regenerated catalyst section into an upper sub-section and a lower sub-section, i.e., the first and second half-regeneration sections, wherein the first half-regeneration section is below the second half-regeneration section.

5. The method according to claim 3, wherein introducing a part of oxygen-containing gas by a first gas distributor into the semi-regenerated catalyst section in the regenerator; the flux of the oxygen-containing gas that introduced into the semi-regenerated catalyst section is 30% to 40% of the total flux of the oxygen-containing gas into the regenerator.

6. The method according to claim 4, wherein introducing a part of oxygen-containing gas by a second gas distributor into the upper section of the semi-regenerated catalyst section directly; the flux of this part of oxygen-containing gas is less than or equal to 10% of the total flux of the oxygen-containing gas into the regenerator.

7. The method according to claim 5, wherein introducing a part of oxygen-containing gas by a second gas distributor into the upper section of the semi-regenerated catalyst section directly; the flux on this part of oxygen-containing gas is less than or equal to 10% of the total flux of the oxygen-containing gas into the regenerator.

8. The method according to claim 1, wherein providing a dense phase fluidized bed with a gas apparent velocity of the catalyst of 0.2 to 0.6 m/s inside the catalyst mixing section of the reactor; and providing an internal catalyst-circulating and mixing conduit inside the catalyst mixing section, so that the catalyst in the mixing section is circulated between the conduit and the fluidized bed in the mixing section.

9. The method according to claim 1, wherein providing a spent-catalyst returning pipe between the steam stripping section of the reactor and the catalyst mixing section at the bottom of the reactor to return part of the spent catalyst to the catalyst mixing section.

10. The method according to claim 1, wherein the reaction-regeneration method for catalytic cracking reaction is implemented in the following processes:

1) the regenerator is configured in a three-section regeneration form wherein the first section is set at the middle part of the coke-burning zone, the second section is set at the upper part of the coke-burning zone, and the third section of the regenerator is set at the bottom part of the coke-burning zone;

wherein introducing the regenerated catalyst in regenerated catalyst section into the catalyst mixing section of the reactor;

2) returning a part of the spent catalyst in the steam stripping section to the catalyst mixing section at the bottom of the reactor via a spent-catalyst returning pipe, or introducing the semi-regenerated catalyst from the first or second section in the coke-burning zone into the catalyst purifying and cooling device firstly to be cooled to a required temperature and the gaseous medium carried by the catalyst is released or stripped by displacement, and then introducing the purified cooled semi-regenerated catalyst into the catalyst mixing section at the bottom of the reactor; mixing the returned spent catalyst or the purified cooled semi-regenerated catalyst with the regenerated catalyst fed from a regenerated-catalyst standpipe to form a catalyst colder than the regenerated catalyst, and the formed catalyst flows upwards under the action of a pre-lift medium to contact and vaporize the feedstock oil and catalyze the catalytic cracking reaction;

3) atomizing the reaction feedstock oil via an atomizing nozzle, then introducing the atomized feedstock oil into the vaporization zone of the reactor to contact with the catalyst mixture from the catalyst mixing section to be vaporized; the vaporized oil vapor and the catalyst are immediately mixed with the semi-regenerated catalyst from the purifying and cooling device to undergo gas-phase cracking reaction;

4) the catalyst mixing section has a diameter greater than that of the cracking reaction section of the riser to thoroughly mix the catalyst coming from the regenerated-catalyst standpipe and the spent-catalyst returning pipe or the purifying and cooling device; introducing the pre-lift medium into the reactor at the bottom of the catalyst mixing section to thoroughly mix the catalyst and meanwhile transport the catalyst;

5) the catalyst purifying and cooling device includes a catalyst cooling portion and a carried-gas stripping portion; a heat-exchange tube is provided within the catalyst cooling portion; introducing the catalyst into the purifying and cooling device from an inlet pipe and discharging the purified and cooled catalyst to the reactor via a transporting pipe; introducing the stripping medium into the purifying and cooling device at the bottom, and discharging the stripping medium and the gas carried by the catalyst at the top;

6) after reaction, separating the catalyst and the product gas of reaction in the reactor by a gas-solid separator, introducing the product gas of reaction into a fractionation column, and introducing the catalyst into the steam stripping section for stripping, returning the stripped spent catalyst to the regenerator to undergo regeneration;

7) after stripping in the steam stripping section, introducing the spent catalyst into the first section of the coke-burning zone of the regenerator to react with the oxygen-containing gas coming from below to form semi-regenerated catalyst in the first and second sections; returning the semi-regenerated catalyst in the second section to the lowest third section of the regenerator to continue to be regenerated into regenerated catalyst; introducing the regenerated catalyst into the catalyst mixing section at the bottom of the reactor; directing a part of the semi-regenerated catalyst out of the regenerator to be processed in the catalyst purifying and cooling device and then into the reactor; and discharging the flue gas in the regenerator upwards into the dilute phase section to be separated by a gas-solid separator.

11. The method according to claim 1, wherein installing a heat exchange tube in the upper part in the catalyst zone of the catalyst purifying and cooling device, heating the reactants in the heat exchange tube while the catalyst is cooled, and introducing the heated reactants into the reactor; or, generating steam in the heat exchange tube; providing a displacement or stripping zone for the gas carried by the catalyst at the lower part in the catalyst purifying and cooling device.

12. The method according to claim 1, wherein after vaporizing the feedstock oil, the entire gas-phase reaction zone of the reactor serves as a riser reactor, or providing a reaction section with an enlarged diameter above the inlet of the cooled purified catalyst where the cracking of the feedstock oil has lasted over a reaction period of 0.8 to 1.5 seconds; in the reaction section with an enlarged diameter, the gas phase flow velocity is 1.8 m/s to 4.0 m/s, and the reaction time is 3.0 to 5.5 seconds.

13. The method according to claim 1, wherein the semi-regenerated catalyst that enters the reactor has a carbon content of 0.10 to 0.5 wt %.

14. The method according to claim 1, wherein controlling the semi-regenerated catalyst in the upper part of the coke-burning zone of the regenerator at a carbon content of 0.15 to 0.4 wt %.

15. The method according to claim 1, wherein controlling each section of the coke-burning zone of the regenerator at the condition of a fast fluidized bed, the gas superficial velocity in the semi-regenerated catalyst section is 0.6 to 2.5 m/s, and the gas superficial velocity in the regenerated catalyst section of the coke-burning zone is 0.6 to 1.2 m/s.

16. The method according to claim 1, wherein controlling the temperature of the semi-regenerated catalyst section of the coke-burning zone of the regenerator between 650° C. and 720° C., and controlling the temperature of the regenerated catalyst section between 640° C. and 700° C.

17. The method according to claim 1, wherein controlling the amount of the semi-regenerated catalyst or spent catalyst that enters the catalyst mixing section of the reactor at 10% to 100% of the amount of the regenerated catalyst.

18. The method according to claim 1, wherein controlling the amount of the semi-regenerated catalyst that enters the reactor from above the feedstock oil inlet of the reactor at 10% to 50% of the amount of the regenerated catalyst that enters the reactor.

19. The method according to claim 1, wherein providing a catalyst mixing circulation tube within the catalyst mixing section, the flux section area of this tube is 10% to 40% of the flux section area of the catalyst mixing section; the gas apparent velocity in the inner circulation tube is between 1.5 m/s and 5.0 m/s.

20. An apparatus for implementing the reaction-regeneration method for catalytic cracking reaction according to claim 1, including a regenerator, a reactor, and a catalyst purifying and cooling device, arranged in parallel, wherein:

according to the inlet position and flow direction or distribution of the fed spent catalyst and the coke-burning degree, the coke-burning zone of the regenerator is divided into a semi-regenerated catalyst section and a regenerated catalyst section, wherein the regenerated catalyst section is located below the semi-regenerated catalyst section, and a spent catalyst inlet is provided in the lower part of the semi-regenerated catalyst section; and wherein the regenerator is provided with a returning pipe which introduces the semi-regenerated catalyst from the semi-regenerated catalyst section of the coke-burning zone to the regenerated catalyst section;

the reactor has a riser reaction section as the main part, a catalyst mixing section with a enlarged diameter is provided at the bottom of the reactor, and feedstock oil inlets of the reactor are provided between the catalyst mixing section and the riser reaction section, wherein above the feedstock oil inlet are a feedstock oil vaporization zone and a catalytic cracking reaction zone in this order, and a settler is provided downstream of the catalytic cracking reaction zone;

between the regenerator and the catalyst purifying and cooling device, a semi-regenerated catalyst transporting pipe is provided to introduce the semi-regenerated catalyst from the regenerator to the catalyst purifying and cooling device; between the catalyst purifying and cooling device and the reactor, a semi-regenerated catalyst feeding pipe is provided to feed the semi-regenerated catalyst in the catalyst purifying and cooling device to the reactor from above the reaction feedstock oil inlets, and another semi-regenerated catalyst feeding pipe is provided to feed the semi-regenerated catalyst in the catalyst purifying and cooling device to the catalyst mixing section at the bottom of the reactor.

* * * * *